US008687115B2

(12) United States Patent
Doser et al.

(10) Patent No.: US 8,687,115 B2
(45) Date of Patent: Apr. 1, 2014

(54) METHOD AND APPARATUS FOR PROCESSING VIDEO IMAGE SIGNALS

(75) Inventors: Ingo Tobias Doser, Burbank, CA (US); Carlos Correa, Villingen-Schwenningen (DE); Cedric Thebault, Villingen-Schwenningen (DE)

(73) Assignee: Thomson Licensing, Issy les Moulineaux (FR)

( * ) Notice: Subject to any disclaimer, the term of this patent is extended or adjusted under 35 U.S.C. 154(b) by 1648 days.

(21) Appl. No.: 11/793,092

(22) PCT Filed: Dec. 12, 2005

(86) PCT No.: PCT/EP2005/056692

§ 371 (c)(1), (2), (4) Date: Jun. 14, 2007

(87) PCT Pub. No.: WO2006/063978

PCT Pub. Date: Jun. 22, 2006

(65) Prior Publication Data

US 2008/0106506 A1 May 8, 2008

(30) Foreign Application Priority Data

Dec. 15, 2004 (EP) .................................... 04300899

(51) Int. Cl.
*H04N 7/01* (2006.01)
*H04N 11/20* (2006.01)

(52) U.S. Cl.
USPC ............................ 348/451; 348/441; 348/448

(58) Field of Classification Search
USPC ................ 348/441, 446, 458, 364, 222, 581; 345/72
See application file for complete search history.

(56) References Cited

U.S. PATENT DOCUMENTS 4,603,350 A * 7/1986 Arbeiter et al. ............... 348/448
5,014,116 A * 5/1991 Kawai ........................ 348/436.1

(Continued)

FOREIGN PATENT DOCUMENTS

EP 0909092 4/1999
EP 0765572 6/2000

(Continued)

OTHER PUBLICATIONS

"Noninterlaced-To-Interlaced Television-Scan Converter" NTIS Tech Notes, US Department of Commerce, Sep. 1, 1988, pp. 75801-75802.

(Continued)

*Primary Examiner* — Jefferey Harold
*Assistant Examiner* — Michael Teitelbaum
(74) *Attorney, Agent, or Firm* — Robert D. Shedd; Jeffrey M. Navon

(57) ABSTRACT

An imager achieves a desired image resolution by successively reproducing partial images which complement each other. The imager assigns pixels from an input image to the respective partial images according to complementing patterns that correspond to the pixel pattern of the imager. The imager reproduces the complementing pattern at different spatial positions, such that the complementing patterns merge. In order to avoid perceived double imaging of moving objects the image signal provided to the imager is assembled from an original image and a motion compensated interpolated image, which is derived from at least two consecutive images. Accordingly, every other partial image that is reproduced is derived from an interpolated image and takes into account movement of objects in the image that takes place between two consecutive images. In one embodiment the partial images are re-combined into one full image in a sequence that anticipates the distribution of the pixels used in the imaging device.

7 Claims, 6 Drawing Sheets

(56) References Cited

U.S. PATENT DOCUMENTS

| | | | | | |
|---|---|---|---|---|---|
| 5,552,825 | A * | 9/1996 | Talluri et al. | 348/222.1 |
| 5,610,662 | A * | 3/1997 | Hackett | 348/452 |
| 5,894,329 | A | 4/1999 | Takeda et al. | |
| 5,905,841 | A * | 5/1999 | Peters et al. | 386/290 |
| 5,910,820 | A | 6/1999 | Herz et al. | |
| 6,061,094 | A * | 5/2000 | Maietta | 348/446 |
| 6,801,665 | B1 * | 10/2004 | Atsumi et al. | 382/239 |
| 6,904,184 | B1 * | 6/2005 | Taylor | 382/294 |
| 6,937,291 | B1 * | 8/2005 | Gryskiewicz | 348/581 |
| 7,012,648 | B2 | 3/2006 | Kondo et al. | |
| 2001/0054996 | A1 * | 12/2001 | Naka et al. | 345/72 |
| 2002/0075959 | A1 * | 6/2002 | Dantwala | 375/240.16 |
| 2005/0231644 | A1 * | 10/2005 | Salzer et al. | 348/701 |
| 2006/0139485 | A1 * | 6/2006 | Kim et al. | 348/441 |

FOREIGN PATENT DOCUMENTS

| | | |
|---|---|---|
| JP | 61125295 | 6/1986 |
| JP | 61141286 | 6/1986 |
| JP | 2624507 | 6/1997 |
| JP | 10501953 | 2/1998 |
| JP | 11112939 | 4/1999 |
| JP | 2002369155 | 12/2002 |
| JP | 3495485 | 9/2004 |

OTHER PUBLICATIONS

Search Report Dated Feb. 27, 2006.

* cited by examiner

METHOD AND APPARATUS FOR PROCESSING VIDEO IMAGE SIGNALS

This application claims the benefit, under 35 U.S.C. §365 of International Application PCT/EP2005/056692, filed Dec. 12, 2005, which was published in accordance with PCT Article 21(2) on Jun. 22, 2006 in English and which claims the benefit of European patent application No. 04300899.4, filed Dec. 15, 2004.

In the following description the term frame refers to a video image having a first resolution in terms of pixels that are arranged in rows and columns, which pixels are displayed essentially simultaneously for every frame. In the case of film sequences, multiple frames are displayed consecutively at a first rate, at which an observer perceives an image having fluid motion. Video showing a sequence of frames is also referred to as progressive video. The term field refers to a partial image, preferably a partial image having half the number of pixels than a corresponding frame. Fields are known from interlaced video display, e.g. in television sets, in which a frame is split into two fields, and in which a so-called odd field includes all pixels that are arranged in rows having an odd row number, e.g., 1, 3, 5, . . . and in which a so-called even field includes all pixels that are arranged in rows having an even row number, e.g. 2, 4, 6. . . . In television apparatus, the odd and the even fields are shown alternately. The odd and even fields in television systems not only show pixels that are located in different places across the image, but also the odd and even fields that are making up one frame are taken at two different time instants. This type of video signals is also referred to as true interlaced video. When cinematographic Film is transferred to video that is intended for display in television system using interlaced video, every picture of the cinematographic film is first scanned as a frame and is subsequently split into two so-called segmented frames. The two segmented frames are similar to the odd and the even fields known from interlaced video, but represent an image taken at a single time instant. Hence, when a display that is adapted to reproduce a sequence of frames, or progressive video, receives a true interlaced video signal a de-interlacer has to combine two fields into one frame. In case of moving objects in the true interlaced video signal the motion of the objects from one field to the other has to be taken into consideration and to be compensated for.

The explanation of the terms above referred to interlaced video and segmented frames as having two partial images. It is obvious that any number of partial images greater than two can be present and shall be included in the scope of the invention described hereafter.

The invention relates in particular to video display apparatus that is adapted to display images using a quincunx-type pixel arrangement. Such a display apparatus is, e.g., a DLP, or Digital Light Processing apparatus with a HD3 DLP (R) that uses a diagonal pixel structure and a wiggling fold mirror. HD3 DLP (R) is an image reproduction device, or imager, of Texas Instruments™. However, the invention can be applied to any display technique that provides for sequentially displaying partial images, wherein the partial images include pixels selected according to two or more complementary spatial pattern.

Using an imaging device to sequentially reproduce complementing images allows for increasing the resolution of the display with respect to the native resolution of the imaging device. In the case of the aforementioned HD3 DLP imaging device two partial images are displayed, which complement each other, thus doubling the resolution compared to the native resolution of the imaging device.

For displaying the first partial image, light modulated by the individual pixels of the imaging device is reproduced at respective first locations. For displaying the second partial image, the light modulated by the individual pixels of the imaging device is reproduced at respective second locations. Switching between the respective first and second locations can e.g. be achieved by correspondingly projecting the modulated light on a screen via a mirror that can be tilted, or by correspondingly moving the imaging device. The degree of tilt is chosen such that the pixels of the second partial image are reproduced between the respective pixels of the first partial image.

FIG. 1 shows an exemplary full image A comprising pixels arranged in six rows and eight columns. The low number of rows and columns is chosen for demonstration purposes only and may vary, in particular, the number of rows and columns may be substantially higher. The image is displayed, in an imaging device of the aforementioned quincunx-type, by consecutively reproducing a first partial image A' and a second partial image A". The pixels of the first and the second partial image A', A" complement each other, and when the switching between the partial images is quick enough the human eye perceives a full image having the full resolution. It is to be noted that, for reasons of simplification in this specification, the exemplary quincunx pattern is shown orthogonally, which may lead to disturbances in the edge regions of the image. This effect can be compensated for by using a quincunx-pattern that is rotated by 45°, i.e. a pattern of diamonds arranged in quincunx arrangement. It is also possible to compensate for these edge effects by accordingly driving the pixels at the edges of the imaging device, e.g. by leaving some of the pixels in the outermost row or columns black. However, as real imagers have very high resolutions in the region of 1000 pixels in a row or even above, small disturbances could even be ignored.

FIG. 2 exemplarily shows an object that is moving diagonally across the exemplary screen of FIG. 1. The movement is indicated by the arrow pointing from bottom left to top right. If the imaging device would display a sequence of full images, or frames, each frame would show the object at a different position, depending on the movement of the object. Consequently, given a sufficiently high image frame rate, an observer's eye would perceive an impression of a smoothly moving object. As the type of imaging devices to which the invention refers shows each frame in a sequence of partial images, or frames, the moving object is reproduced several times at the same location. The observer's eye, however, expects the object to show up at a different location each time it is reproduced, as it follows the trajectory of the object. This phenomenon is shown in greater detail in FIG. 3.

In FIG. 3 a sequence of partial images A1', A1" to A6', A6" is shown over a horizontal time axis. The partial images having the single index correspond to the partial images that are shown first, whereas the partial images having the double index correspond to the complementing partial images that are shown thereafter in order to complete reproduction of the full image, or frame. In the sequence of full images A1 to A6 the moving object has a different location in every single image. The different locations are indicated by the different loci of the respective objects in the direction of the vertical axis. It can be seen that the object is reproduced twice at the same location for two subsequent instants of time when a first full image is reproduced by consecutively reproducing the complementing first and second partial images. The complementing nature of the partial images is indicated by the pattern complementing to a fully filled object. The object achieves a new position when the next full image is reproduced, and again it is shown twice in this position. The observer's eye tries to follow the movement of the object and expects the object to appear on the path of the trajectory, as indicated by the expected object E in the figure. However, as the object is shown twice in the same place for every full image, perceived double imaging occurs for moving objects.

This effect occurs in particular when a true interlaced signal comprising two image fields taken at different time instants is fed to an imaging device of the quincunx-type directly, i.e. without passing it via a de-interlacer that provides for proper motion compensation. A de-interlacer that provides proper motion compensation produces an image that is equivalent to a full image frame.

It is, therefore, desirable to provide an improved method for controlling a display device which reproduces images by consecutively reproducing partial images, in particular for controlling a display device of the above-mentioned quincunx type.

The method according to the invention improves the reproduction of images comprising pixels arranged in rows and columns by means of imaging devices which reproduce a full image by alternating reproduction of pixels selected from the full image according to complementing first and second pattern. By selecting pixels from the full image according to the complementing first and second pattern the image is split into a first and a second partial image. The first and second partial images are displayed sequentially at different spatial positions and the superimposed first and second partial images complement each other. According to the invention the method includes the steps of receiving a sequence of input images at a first frame rate and calculating an interpolated image from at least two consecutive images received at the first frame rate. The method further includes the step of selecting pixels from an input image or an interpolated image according to the first pattern for outputting as a first partial image. The method further includes the step of selecting pixels from the corresponding interpolated image or a corresponding input image according to the second pattern complementing the first pattern for outputting as a second partial image. Thereby every other partial image that is reproduced is taken from an interpolated image. By reproducing first and second partial images alternatingly taken from original images and interpolated images moving objects are displayed in places or locations on the screen that correspond to their movement and the time instant of reproduction.

In a development of the invention the step of calculating an interpolated image includes calculating the interpolated image using temporal and/or spatial motion compensation.

In a further development of the invention the method further includes the steps of storing the received input images and/or storing the interpolated images.

In one embodiment of the invention the pixels selected from an input image or an interpolated image according to the first pattern to be output as the first partial image are output consecutively. In the same way the pixels selected from the corresponding interpolated image or the corresponding input image according to the second pattern to be output as the second partial image are output consecutively. In this way it is possible to provide the imaging device with the pixels that are required for reproducing the first and the second partial images in the correct sequence, i.e. a first series of consecutive pixels is transmitted which forms the first partial image, and thereafter a second series of consecutive pixels is transmitted which forms the second partial image. An image is displayed, e.g., whenever all pixels that are required to reproduce a partial image have been received by the imaging device. It is obvious that throughout the specification the term pixel is also used representative of the data that describes the pixel.

In another embodiment of the invention the pixels selected from an input image or an interpolated image according to the first pattern to be output as the first partial image and the pixels selected from a corresponding interpolated image or a corresponding input image are output in such a way that the neighbouring pixels in a row or a column are output consecutively, independent of their origin in the input image or the interpolated image. In this way the first and the second partial image are output as a complete image frame. This embodiment of the invention is particularly advantageous for imaging devices which accept full images, or frames, at their input, and which perform splitting up the full image into partial images on their own. Since the way the imaging device splits up the full image into partial images is known beforehand this embodiment of the invention offers full images that are assembled to according to the generation of the partial images in the imaging device. The full image that is applied to the input of the imaging device in this case has pixels that are taken from an original image and an interpolated image, and which are assembled to form one full image. The such-assembled full image includes image information corresponding to two different time instants. The image information belonging to the respective time instant is output in the respective partial image as the imaging device generates the partial images for sequential reproduction.

The complementing pattern according to which the pixels for the first or the second partial image are selected preferably is a quincunx pattern. The complementing first and second quincunx patterns are shifted by one pixel in the direction of a row or a column with respect to each other. It is, however, conceivable to use other complementing pattern in accordance with the invention.

The invention will be described in the following with reference to the drawing. In the drawing FIG. 1 exemplarily shows the distribution of pixels of an image frame to complementing partial images according to first and second pattern;

FIG. 2 depicts an exemplary moving object on a screen;

FIG. 3 diagrammatically demonstrates the visual effect of reproduction of a moving object by sequentially reproducing partial images;

FIG. 4 schematically depicts the generation of a frame according to the invention;

FIG. 5 schematically shows the assignment of pixels to partial images according to the invention;

FIG. 6 diagrammatically demonstrates the visual effect of reproduction of a moving object by sequentially reproducing partial images generated according to the invention;

FIG. 7 schematically depicts the formation of a video signal according to a first embodiment of the invention;

FIG. 8 schematically depicts the formation of a video signal according to a second embodiment of the invention;

In the figures same or similar elements are referenced by the respective same reference symbols.

Figure 1:
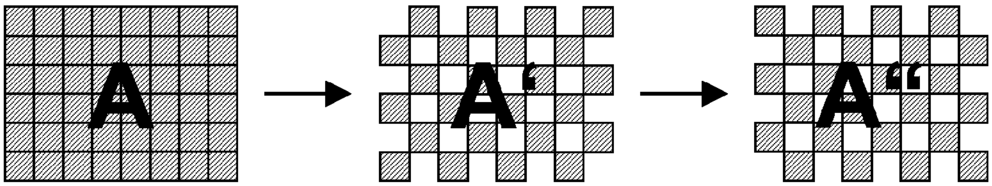
Fig. 1 Prior Art
Figure 2:
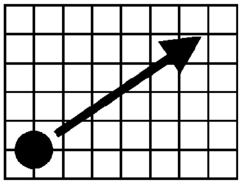
Figure 3:
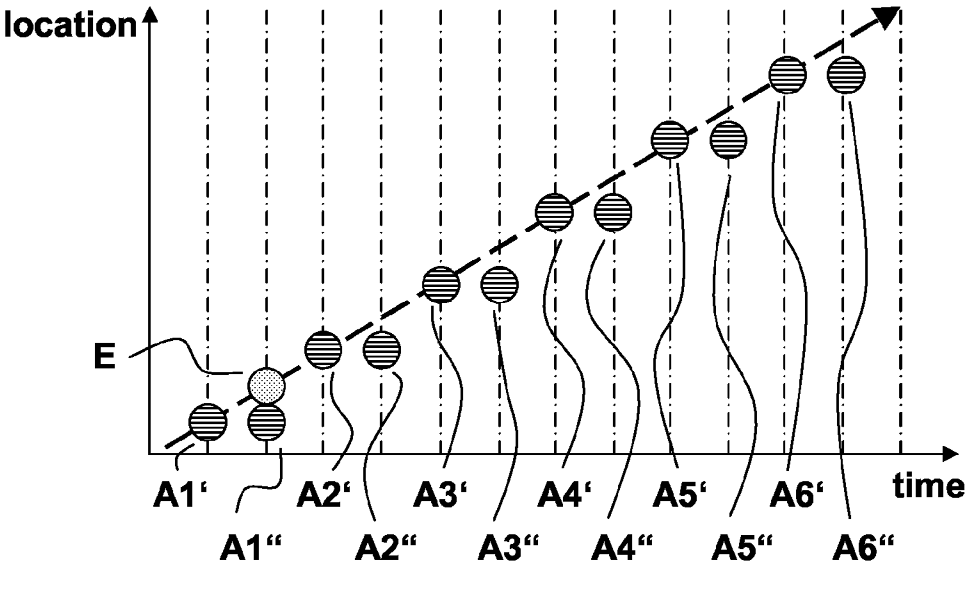

FIGS. 1 to 3 have been described above in the prior art section and are not referred to in detail again.

Figure 4:
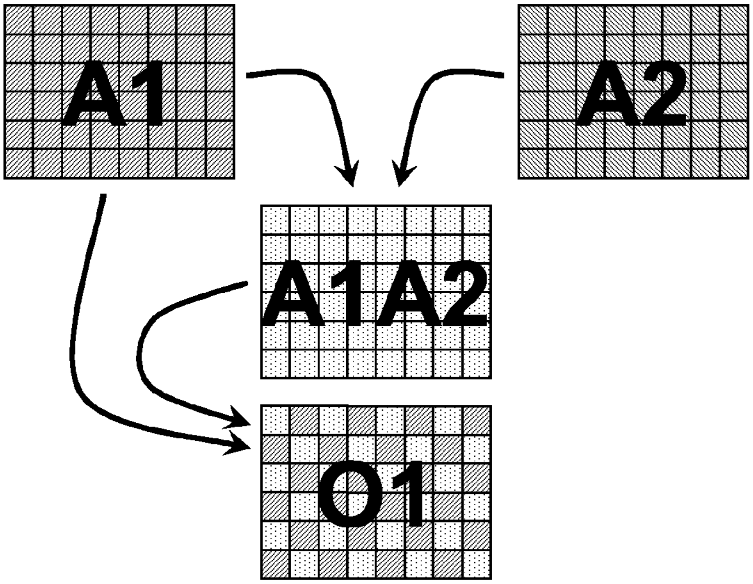

FIG. 4 shows two exemplary full images A1 and A2, which are following each other in a sequence of full images. The full images A1 and A2 represent images that are taken at two different time instants and which may show objects that have been moving between the two time instants. The images A1 and A2 are used to calculate an interpolated image A1A2, which shows a calculated representation of the image content at a time instant between the respective time instants at which the full images A1 and A2 were taken. Thus, a moving object would have achieved a position in the interpolated image A1A2 in between the positions it had in the full image A1 or it will have in the full image A2. The arrows in the figure indicate the contribution of the respective images to the interpolated image and the output image. An output image O1 is assembled using image information from the original image A1 and the interpolated image A1A2. Assembly of the image is performed according to respective first and second patterns which complement each other. In FIG. 4 the pattern used is a quincunx pattern. Full image A1 represents a scene taken at a first instant in time and full image A2 represents a scene taken at a second, later instant in time. The interpolated image A1A2 represents a virtual image of the scene at a time instant in between A1 and A2. The assembled output image O1 includes image information belonging to two different time instants. An imaging device of the above-mentioned type selects only the image information corresponding to one of the two different time instants for display at a time. Accordingly, assembly of the image information is performed considering the way of the imaging device selects the information from the full image for sequential display of partial images. In the figure pixels belonging to the respective images A1, A2, A1A2 and O1 are indicated by different types of hashes and dot pattern, respectively.

Figure 5:
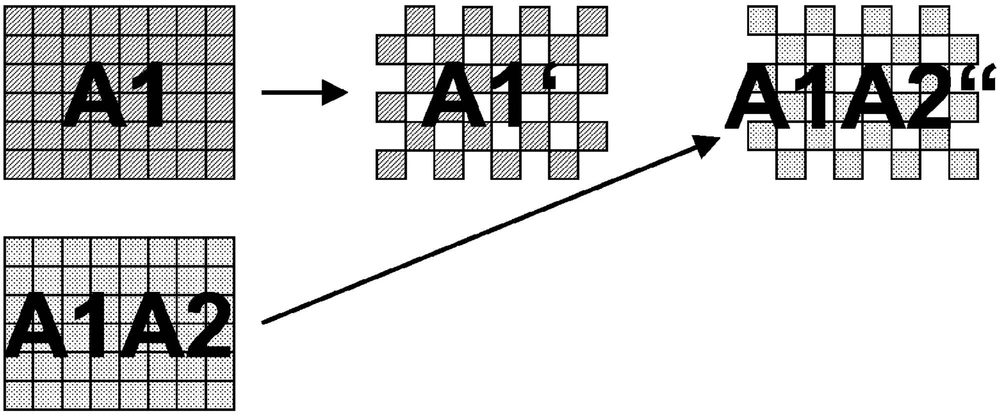

In FIG. 5 the assignment of pixels from the original image A1 and the interpolated image A1A2 to the respective partial images A1' and A1A2" is shown. Again, the exemplary complementing pattern is a quincunx-type pattern. The single and double indices indicate membership of pixels to a first or a second partial image which are reproduced successively.

Figure 6:
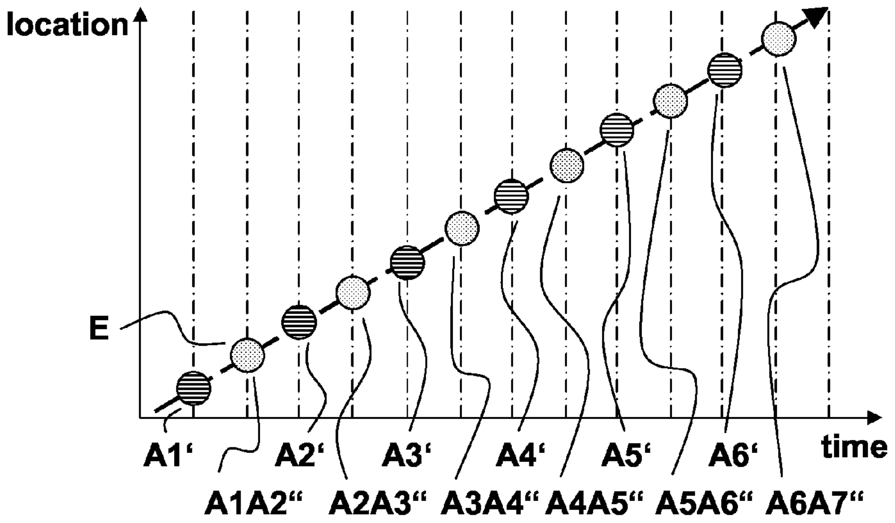

In FIG. 6 in exemplary timing of partial images that are reproduced consecutively and the visual effect thereof is shown. The image content is the same as was described in FIG. 2, an object moving from bottom left to top right. Similar to FIG. 3 every other partial image is taken from an original image, i.e. the content of image A1 is used for reproducing the partial image A1', the content of image A2 is used for reproducing the partial image A2' and so on. However, the complementing partial images A1A2", A2A3" reproduced in between are taken from the interpolated images A1A2, A2A3 and so on. As the object has already moved in the interpolated images, the position of the object in the partial images taken from the interpolated images is reproduced at a location that corresponds to the location the observer expects. In this way, as the observer's eye follows the trajectory of the object, double imaging is avoided. In the figure the membership of the object to an original image or an interpolated image is indicated by the hashing style or dot pattern, respectively.

Figure 7:
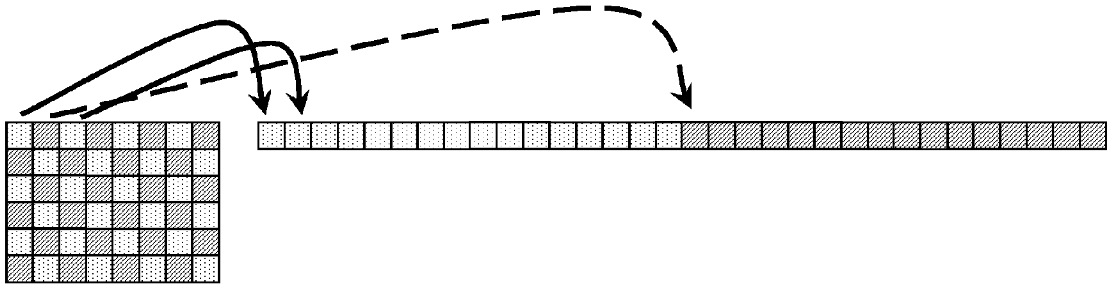

FIG. 7 shows the assembly of a video signal according to one embodiment of the invention. In this embodiment of the invention pixels belonging to one partial image are output consecutively and only thereafter the pixels belonging to the other partial image are output consecutively. In this way all image data for the respective partial image is transmitted for display as a whole. The generation of the output signal according to this embodiment of the invention allows for an imaging device to start reproducing one partial image after all image data for this partial image has been received. If partial images are buffered before they are reproduced the size of the memory can be kept as low as one partial image. Once the image content is transferred to the imaging device the memory can be filled with the data for the next partial image which is to be displayed. The assignment of pixels to their respective positions in the image data stream is indicated by the solid and dashed arrows, respectively. Further, the origin of the pixels from an input image or an interpolated image is indicated by the different styles of hashing or dot pattern, respectively.

Figure 8:
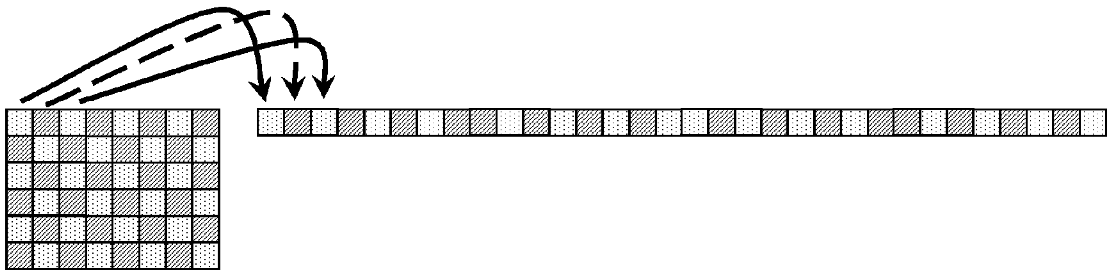

FIG. 8 shows the assembly of a video signal according to another embodiment of the invention. In this exemplary embodiment of the invention pixels of the image are output irrespective of their later use for reproducing a first or a second partial image. This embodiment of the invention is advantageous when the imaging device stores image data of a full image and performs the distribution of the pixels to a first or a second partial image on its own. When the pattern is known that is used by the imaging device to distribute the pixels to a first or a second partial image the video signal can be composed according to that pattern such that the transferred full image has pixels of the original image in those places which are reproduced as a first partial image and pixels of the interpolated image in those places which are reproduced as a second, complementing partial image. In the exemplary embodiment shown in the figure the pixels are scanned in a row by row manner from the left to the right, and the complementing pattern used for the first and the second partial image is a quincunx-type pattern. It is obvious that any other scanning patterns may be used for synthesising the output data stream. Again, solid and dashed arrows indicate the assignment of pixels to their respective positions in the image data stream. Also the different styles of hashing or dot pattern indicate the membership of the pixel to an original image or an interpolated image.

Figure 9:
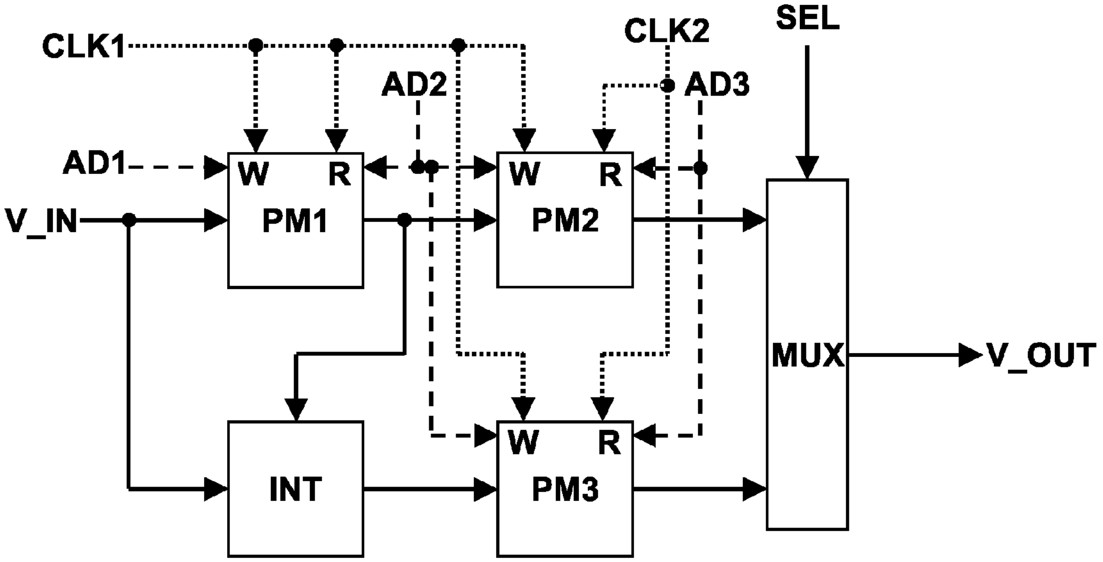
FIG. 9 shows a first exemplary circuit for assembling frames from original and interpolated images.

In FIG. 9 an exemplary circuit for producing an interpolated frame using motion compensation is shown. Image data is received at input V_IN and is stored in a first picture memory PM1. Picture memory PM1 is a dual port memory, for example, which allows for independent access for reading and writing of data. Picture memory PM1 and all other memories used in this circuit have a write clock input for writing to the memory, a read clock input for reading from the memory, a write address input, a read address input, a data input and a data output. For reasons of simplification, the inputs and outputs are indicated by the direction of the connecting arrows. The respective type of input and output is indicated by the label associated to the arrow. The association of an input or an output of the memory blocks to reading or writing, respectively, is indicated by references R and W, respectively, in the memory blocks. Picture memory PM1 is filled with video input data by accordingly incrementing an address counter, beginning at a defined starting address and in synchronism with vertical and horizontal synchronisation signals (not shown). A vertical synchronisation signal indicates the start of a new video frame at the input V_IN. With each CLK1 clock cycle applied to the write-side input W of the first picture memory PM1 the write address pointer AD1 is incremented until the synchronisation signal indicates the start of a new frame. CLK1 is the horizontal pixel clock, for example, when the video data is supplied in a row-by-row fashion. When the start of a new frame is indicated the write address pointer AD1 is reset to the defined starting address position. Simultaneously, data is read from the memory output using the CLK1 clock connected to the read-side input R.

In this exemplary circuit, the same clock CLK1 is used for reading and writing. Picture memory PM1 operates as a frame delay, therefore the data written must be read before it is overwritten again. Thus, as the read address pointer is incremented with every CLK1 clock cycle applied to the read-side input R, care must be taken that the read address and the write address are properly synchronised with the vertical synchronisation signal, since the read address must not overtake the write address. For example, the read address is offset from the write address by one clock cycle, i.e. it is one clock cycle behind.

The interpolator block INT has two inputs: to one input the same video signal V_IN that is input into the first picture memory PM1 is applied, the other input is connected to the data output of the first picture memory PM1. The interpolator INT thus receives two consecutive video frames. This interpolator INT performs the temporal interpolation between two consecutive frames. The purpose of this circuit is to produce four output frames out of two input frames or two output frames out of one input frame, thus a frame rate doubling is achieved, or a frame rate speed-up. This is achieved by storing the delayed input video signal V_IN in a further picture memory PM2 and the interpolated video signal in a further picture memory PM3. Picture memory PM2 is used for reading the original video data, that is, the time delayed video data from V_IN, at a higher frame rate than the original frame rate, and picture memory PM3 is used for reading the temporally interpolated data at a higher frame rate than the frame rate of the original image. These memories are filled with video data in the same way and with the same data rate as picture memory PM1, indicated by the CLK1 clock signal connected to the write-side inputs. For reading the data, however, a second clock signal CLK2 is connected to the read-side clock inputs, which clock signal has twice the frequency of the clock signal CLK1, but otherwise has a fixed timing relationship thereto. For all picture memories PM1, PM2 and PM3 the timing relationship must be fixed such that a memory is not read before it has been written, i.e., the read address pointer must not overtake the write address pointer. At the output of picture memory PM2 the original input video frames are present and can be read at twice the input frame rate. The output of picture memory PM3 provides the interpolated video frame and can also be read at twice the original frame rate. The correct frame sequence is achieved by accordingly selecting frames from the two picture memories PM2, PM3, using the multiplexer MUX. To the multiplexer MUX two input video signals are applied and are selectively present as output video signal at an output V_OUT, depending on a switch signal SEL. The switch signal SEL controls the multiplexer to output one original frame followed by one interpolated frame. Then the next original frame and the respective next interpolated frame are selected for output, and so on. Selection of the original image frames or the interpolated image frames is synchronized with the vertical synchronisation signal at twice the vertical frequency. A small timing offset between the vertical synchronisation signal and the switch signal may be present due to the delay between writing and reading of the picture memories.

The circuit shown in FIG. 9 is a general frame rate up-conversion circuit and cannot be taken as is in case a display which sequentially shows partial images is to be controlled, in particular in case the display is of the quincunx type. In order to control a display of the quincunx type the circuit has to be modified.

Figure 10:
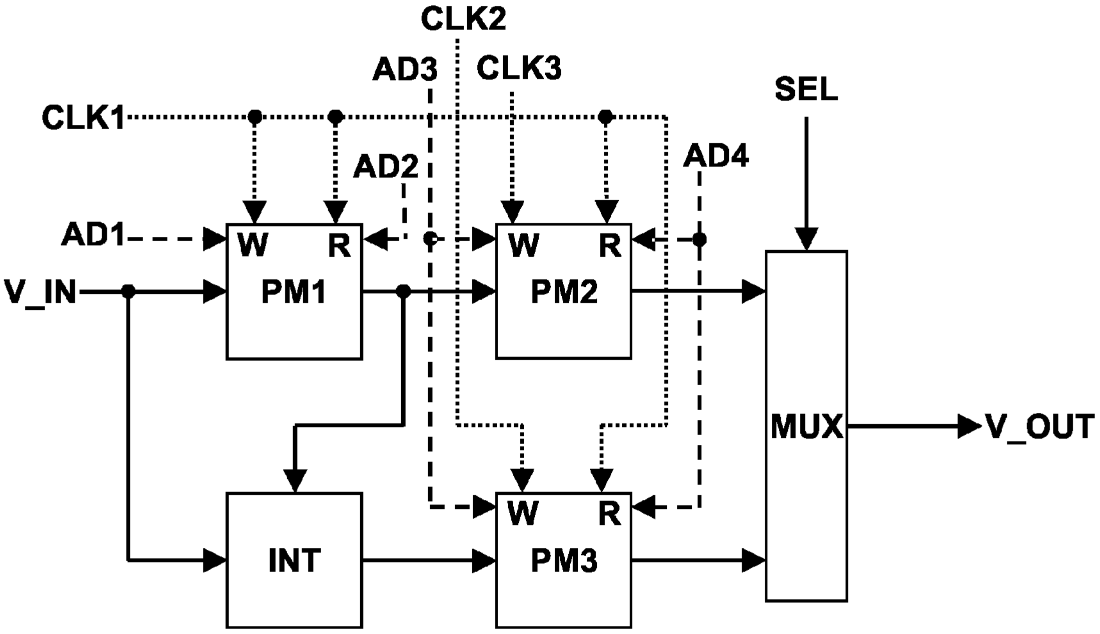
FIG. 10 shows a second exemplary circuit for assembling images from original and interpolated images.

FIG. 10 shows an exemplary circuit for performing the method according to the invention for a quincunx-type display. The display system itself is known from the prior art: it has half the spatial image resolution required to display the full image but uses two consecutive fields that are displayed offset against each other to achieve the full spatial resolution as explained above. The setup of interpolator INT and the picture memories PM1, PM2 and PM3 of the inventive circuit is similar to the one shown in FIG. 9. However, the input pixel clock CLK1 is equal to the output pixel clock. Hence, the clock signal CLK1 is applied to the read-side clock inputs of picture memories PM1, PM2 and PM3. Clock signal CLK1 is further applied to the write-side clock input of picture memory PM1. Further, the storage procedure and therefore also the reading procedure of the picture memories PM2 and PM3 has been modified in accordance with the invention: now half of the information is to be displayed in every display cycle compared to the exemplary circuit shown in FIG. 9. Hence only half of the information has to be stored in the picture memories PM2 and PM3, which accordingly can be smaller. Also, the frequency of the clock signals CLK2 and CLK3 can be lower; they have half the frequency of clock signal CLK1. In one embodiment clock signals CLK2 and CLK3 have the same frequency and are phase shifted by 180 degrees with respect to each other, or, in other words, are inverted.

Referring back to the quincunx pattern shown for example in FIG. 5 the two consecutive fields are not displayed at the same spatial position, rather they are offset by +/−1 pixel against each other. Taking this into account, only every other pixel of the original frame and again only every other pixel of the interpolated frame has to be kept in the memory, the others may be discarded. In order to achieve selection of pixels according to the quincunx pattern, this sequence must be inverted for every new row. The start of a new row is, e.g. signalled by a horizontal synchronising signal (not shown).

Figure 11:
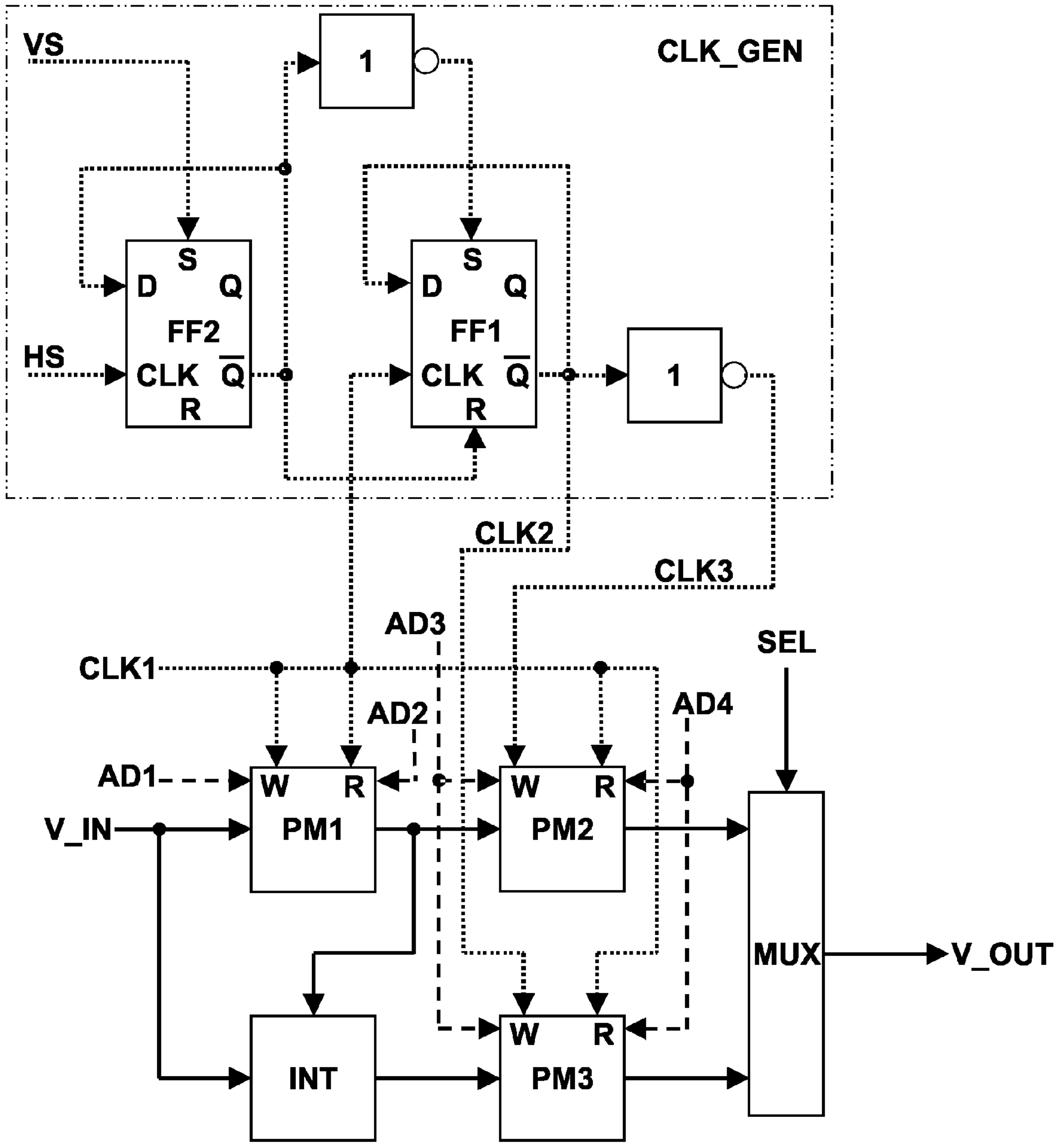
FIG. 11 depicts a clock generating circuit in cooperation with the second exemplary circuit for assembling images.

In the exemplary circuit according to the invention shown in FIG. 10 selection of pixels according to the quincunx pattern is achieved by accordingly manipulating the address counter and write clock signals of the picture memories PM2 and PM3, AD3, CLK2 and CLK3, respectively. The address counter AD3 is synchronised in terms of timing with the address counter AD2, but is only incremented with every second increment of AD2, or with every increment of CLK1. Clock signals CLK2 and CLK3 control writing into picture memories PM2, PM3, wherein CLK2 invokes a writing of the picture memory PM2 for the original frame information at odd pixel positions and clock signal CLK3 invokes writing of the picture memory PM3 for the interpolated frame at even pixel positions. Owing to the quincunx pattern, this sequence is inverted for every subsequent row, in synchronism with the horizontal synchronisation signal (not shown). The block CLK_GEN shown in the dash double-dotted box in FIG. 11 is an exemplary circuit for generating the required clock signals CLK2 and CLK3 based upon the horizontal and vertical synchronisation signals HS, VS and clock signal CLK1. The remainder of the circuit operates in the same way as described before under FIGS. 9 and 10. The output signal V_OUT now includes the image information of two respective partial images, or half frames, consecutively following each other and is supplied to the imaging device.

In another embodiment of the invention a quincunx display unit is used as can be obtained as a 'black box' from OEMs, or original equipment manufacturers. One exemplary display unit includes a so-called HD3 (R) unit of Texas Instruments™. In this case the inventive circuit is connected between the video front-end and the digital input of the display unit, also referred to as light engine. The light engine already includes a quincunx pattern generator. Thus what is required is a way to provide image information that takes into account the assignment of pixels to a first or second partial image and the time instant during which it is displayed in accordance with the quincunx pattern generator provided in the light engine. The inventive circuit described hereafter supplies full images, or frames, to the light engine which are assembled from subframes taking into account the different spatial location of the pixels and the different time instants of reproduction. Full images or frames are representing progressive video signals, as was elucidated further above. The light engine performs the sequencing into two subframes by applying two complementing quincunx pattern masks to the progressive input video frames in an according sequence. For example, the light engine selects pixels from the full image according to a first quincunx pattern starting with an active pixel at the top left to generate a first partial image. Thereafter the light engine selects pixels from the full image according to a second, complementing quincunx pattern to generate a second partial image. The light engine thus performs the sequencing of the pixel data such that the data of the first partial image is passed to the display and is reproduced. After that the mirror is tilted, or repositioned, and the data of the second partial image is passed to the display and is reproduced.

In a development the assembled full image that is supplied to the imaging device is assembled from input images and interpolated images that were generated using motion compensation. Motion compensation is known from the prior art and shall not be discussed in this specification in greater detail. The quincunx pattern is spatially assembled using pixels of the original frame and the interpolated frame, knowing that the quincunx generator in the light engine would itself select the output pixels according to the same quincunx pattern, e.g. starting with the top left pixel as first partial image and the inverse pattern as second partial image. The light engine is thus supplied with a pre-processed video frame which, on a normal display would show double imaging for moving objects. The quincunx-type display, however, processes the pre-processed video data in the anticipated way. The resulting display shows smooth motion, because the inventive pre-processing adapts each displayed subframe so that it corresponds to its own individually compensated motion phase.

Figure 12:
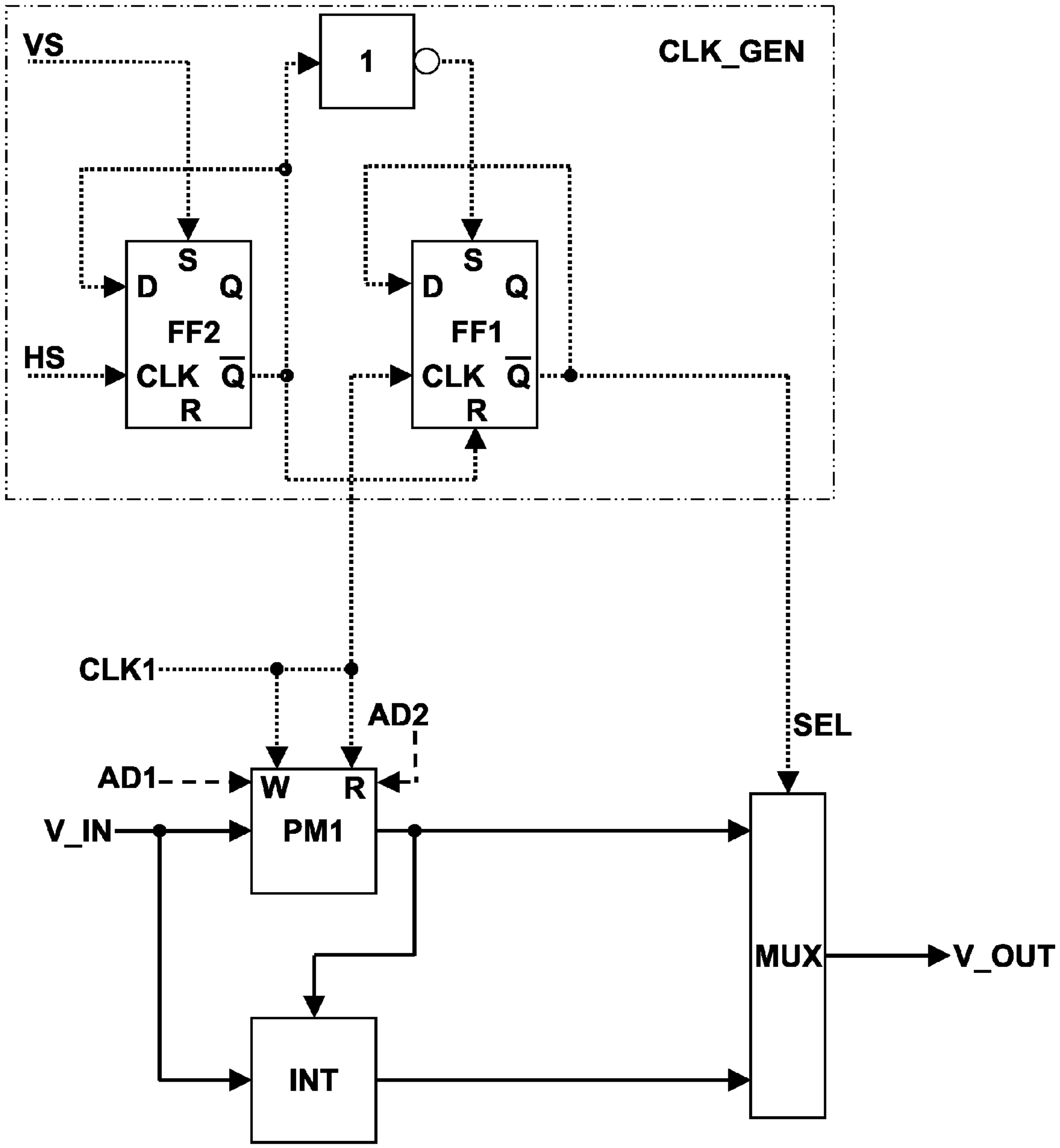
FIG. 12 shows a third exemplary circuit for assembling images from original and interpolated images and a corresponding clock circuit.

FIG. 12 shows an exemplary circuitry according to the above-mentioned embodiment of the invention for supplying a full image to the imaging device, which image is assembled from pixels of the original image and an interpolated image. Since sequencing of the partial images is performed in the imaging device, or light engine, it is no longer necessary to perform this part of the processing in the inventive circuit. The remainder of the circuit functions the same way as in the exemplary inventive systems shown above. However, in contrast to the embodiments discussed before, the multiplexer MUX is not used as a switch for switching subframes but rather for selecting individual pixels. The multiplexer MUX is used for assembling a full image from the original and the interpolated image according to the respective quincunx pattern. Essentially every other pixel the multiplexer MUX selects an original pixel or an interpolated pixel, starting with an original pixel in the first line. In the next line the multiplexer does the same, but in an inverted manner: it starts with the interpolated pixel. The control circuitry is reset in response to the vertical synchronisation signal VS, so that it always starts the same way in the first line with every frame.

Throughout this document the term micro display is used as a synonym for displays reproducing images using two spatially shifted quincunx type rasters. The invention may be used for displays based on DLP, or digital light processing, but it is not limited thereon. Any other micro display technology may be used, provided, a quincunx raster type is used. However, the general idea of the invention may also be applied to imaging devices using a different complementing pattern for producing complementing partial images.

The invention is intended for use in displays which sequentially display images having a predetermined resolution in terms of lines and columns, or X by Y pixels, using an imager that has less pixels than required. The imager reproduces the total number of pixels by sequentially reproducing two partial images which are shifted by one pixel in each direction, i.e. x- and y-direction. The total number of pixels represented in two subsequent periods equals the total number of pixels of the original image. The observer's visual system integrates the sequential images into one full image. However, moving objects, or panning, lead to a double imaging, since the observer expects the moving object to move, or the panning to take place, in a continuous manner. The imager accepts full images, or progressive video signal, at its input and creates two partial images that are displayed sequentially. However, the imager does not perform a motion compensation for the partial images, with the result that the double imaging occurs. The apparatus of the invention accepts at its input the full images, also referred to as progressive video signal, and creates the partial images in the same way as the imager does. Then the partial images are re-combined into one full image, or progressive video signal, but in a modified sequence. This results in that the imager receives a pre-processed or pre-distorted image, which would, on an imager that reproduces full images, or progressive video signals, in one single period, show double images for moving objects or panning. However, due to the particular sequential reproduction that takes place in the imager, as e.g. the Texas Instruments™ TI HD3 imager, for this type of imager the result is a smooth movement or panning, without double images.

The invention claimed is:

1. Method of generating full images for a device for image reproduction, wherein an image to be reproduced includes pixels in rows and columns, wherein the device for image reproduction accepts full images at an input, and wherein the device for image reproduction reproduces a received full image by subsequently reproducing complementing first and second partial images, each partial image being composed of pixels selected from the full image according to corresponding complementing first and second pattern, wherein the method includes the steps of:

a) receiving a sequence of full input images at a first frame rate;

b) calculating an interpolated full image from at least two subsequent full input images received at the first frame rate, the interpolated full image being temporally located in between the at least two subsequent input images received at the first frame rate;

c) selecting pixels from a full input image that is temporally located before the interpolated full image according to the first pattern for composing the first partial image and selecting pixels from the interpolated full image according to the second pattern that complements the first pattern for composing the second partial image, or selecting pixels from the interpolated full image according to the first pattern for composing the first partial image and selecting pixels from a full input image that is temporally located after the interpolated full image according to the second pattern that complements the first pattern for composing the second partial image;

d) composing a full image to be output from the first and second partial images composed in step c); and;

e) outputting the full image composed in step d) to the device for image reproduction at the first frame rate.

2. The method of claim 1, wherein step b) includes calculating the interpolated full image using temporal and/or spatial motion compensation.

3. The method of claim 1, wherein the method further includes the steps of:

a1) storing the received full input images;

b1) storing the interpolated full images.

4. The method of claim 1, wherein, for outputting the full image, the pixels selected according to the first pattern and the pixels selected according to the second pattern are output in such a way that the neighbouring pixels in a row or a column of the full image are output consecutively, irrespective of their origin in the first or second partial image.

5. The method of claim 1, wherein the complementing first and second pattern are quincunx-type pattern that are shifted by one pixel in the direction of a row or a column with respect to each other.

6. Circuit for processing images for display by a device for image reproduction, the images including pixels in rows and columns, wherein the device for image reproduction accepts full images at an input, and wherein the device for image reproduction reproduces a full image by subsequently reproducing pixels selected from the full image in accordance with complementing first and second pattern so as to subsequently reproduce corresponding complementing first and second partial images, the circuit including a first picture memory, an interpolator and a multiplexer, wherein a full input image is applied to the first picture memory and the interpolator in parallel, wherein a delayed full image that is output from the first picture memory is supplied to the interpolator, wherein the interpolator is adapted for calculating an interpolated full image from full image received at the interpolator and the delayed full image, the interpolated full image being temporally located in between the two full images, wherein the multiplexer receives full images that are output from the interpolator and from the first picture memory, for selectively providing pixels from the respective images provided by the first picture memory and the interpolator at an output in accordance with a first and second complementing pattern, the first and second complementing pattern corresponding to first and second partial images, wherein the multiplexer is adapted to provide pixels that are adjacent in a row or a column of the output image signal in a consecutive manner, irrespective of their origin in the first picture memory or the interpolator, thereby outputting a full image composed of the first and the second partial image.

7. The circuit of claim 6, wherein first clock signals are applied to the first picture memory for reading to and writing from the first picture memory and to the clock input of a flip-flop, the set or reset inputs of which are controlled by the inverted or non-inverted output signal of a second flip-flop, respectively, to the clock input of which a horizontal synchronisation signal is applied and to the set input of which a vertical synchronisation signal is applied, and wherein the inverted output of the first flip-flop is applied to the multiplexer as a selection signal.

* * * * *